United States Patent
Zhang et al.

(10) Patent No.: US 8,494,316 B2
(45) Date of Patent: Jul. 23, 2013

(54) DEVICE AND METHOD FOR COLORLESS OPTICAL SWITCHING

(75) Inventors: Guangyong Zhang, Shenzhen (CN); Shuqiang Shen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 13/306,375

(22) Filed: Nov. 29, 2011

(65) Prior Publication Data

US 2012/0070114 A1     Mar. 22, 2012

Related U.S. Application Data

(63) Continuation of application No. PCT/CN2009/072962, filed on Jul. 28, 2009.

(51) Int. Cl.
*G02B 6/28* (2006.01)
*H04J 14/00* (2006.01)

(52) U.S. Cl.
USPC ............ 385/24; 398/45; 398/48; 398/50

(58) Field of Classification Search
USPC ............... 385/24; 398/45, 48–51, 56
See application file for complete search history.

(56) References Cited

U.S. PATENT DOCUMENTS

| | | |
|---|---|---|
| 2002/0131678 A1* | 9/2002 | Bentivoglio Ravasui et al. ............ 385/17 |
| 2003/0152072 A1 | 8/2003 | Guild et al. |
| 2005/0281558 A1 | 12/2005 | Wang et al. |
| 2006/0132174 A1* | 6/2006 | Zami et al. ............... 326/41 |
| 2008/0260383 A1 | 10/2008 | Zhong et al. |
| 2008/0285449 A1* | 11/2008 | Larsson et al. ........... 370/232 |
| 2009/0041457 A1 | 2/2009 | Maki et al. |
| 2012/0070114 A1* | 3/2012 | Zhang et al. .............. 385/16 |

FOREIGN PATENT DOCUMENTS

| | | |
|---|---|---|
| CN | 1901416 A | 1/2007 |
| EP | 1054572 A2 | 11/2000 |
| WO | WO 00/41430 | 7/2000 |
| WO | WO 2004/028197 A2 | 4/2004 |

OTHER PUBLICATIONS

ROADM Network Design Issues Presentation dated Mar. 23, 2009; NFOEC 2009, Tutorial; Sorin Tibuleac; ADVA Optical Networking, Atlanta, GA (48 pgs.).

(Continued)

*Primary Examiner* — Rhonda Peace
(74) *Attorney, Agent, or Firm* — Leydig, Voit & Mayer, Ltd.

(57) ABSTRACT

The present invention discloses a device and a method for colorless optical switching, where the device includes: a demultiplexer, configured to demultiplex the input multi-wavelength light into multiple beams of light with single wavelength; a first optical cross unit, configured to output the received multiple beams of light with single wavelength through target ports to an optical switch array; the optical switch array, configured to drop the light that needs to be dropped from multiple beams of light with single wavelength, receive the light added by the local node, and output the light that needs to pass in the multiple beams of light with single wavelength and the light added by the local node; and a combiner, configured to combine the light output by the optical switch array. The optical switch device and method provided in the embodiments of the present invention feature colorlessness, low insertion loss, and low costs.

9 Claims, 5 Drawing Sheets

OTHER PUBLICATIONS

European Patent Office Communication, pursuant to Rule 62 EPC, the supplementary European search report (Art. 153(7) EPC) and the European search opinion, dated (mailed) Aug. 29, 2012, in related Application No. 09847700.3-1237 (7 pgs.).

Mitsui, Shin-ichi et al., "Hierarchical Optical Path Cross-Connect Node Architecture Using WSS/WBSS" International Conference on Photonics in Switching, Aug. 2008.

International Search Report for International Application No. PCT/CN2009/072962, mailed May 6, 2010 Huawei Technologies Co., LTD.

Zhang, Yu et al. "Research on Multi-Granularity Optical Cross-Connect," Acta Scientiarum Naturalium Univerisitatis Pekinensis Jan. 2007, vol. 43, No. 1, pp. 72-77.

Written Opinion of the International Searching Authority (translation) dated (mailed) May 6, 2010, issued in related Application No. PCT/CN2009/072962, filed Jul. 28, 2009, Huawei Technologies Co., Ltd.

* cited by examiner

DEVICE AND METHOD FOR COLORLESS OPTICAL SWITCHING

CROSS-REFERENCE TO RELATED APPLICATIONS

This application is a continuation of International Application No. PCT/CN2009/072962, filed on Jul. 28, 2009, which is hereby incorporated by reference in their entireties.

FIELD OF THE INVENTION

The present invention relates to optical communications technologies, and more particularly, to a device and a method for colorless optical switching.

BACKGROUND

Optical networks are evolving to mesh networks. In the existing technology, nodes in the optical networks are below 4 dimensions, whereas in the future, nodes in the optical networks will evolve from 2-3 dimensions to 4-5 dimensions, or even more dimensions. This requires advanced optical switching technology.

Currently, granularity in optical switching mainly depends on wavelength exchange, which requires that the optical switching device should have 100% Add/Drop capability. That is, the ratio of the number of Add/Drop wavelengths to the number of the wavelengths input by the optical switching device is required to be 100%. In addition, colorlessness is also required for the optical switch device. Colorlessness indicates that the optical switch device can achieve exchange of light with various wavelengths rather than only light with specific wavelengths.

FIG. 5 shows the structure of an optical switching device provided in the prior art. The working principles of the device are as follows: An optical splitter 31 splits a beam of light into more than one beam of light and drops some beams of light to the local, and a wavelength blocker (WB) 32 selects the wavelengths of other beams of light that needs to pass, and an optical splitter 33 inputs the beams of light, obtained by splitting and dropped to the local, into a tunable filter array 34, where the output port of the tunable filter array 34 can selectively implement the dropping of light with any wavelength. The optical splitter 33 may be a 1×N optical splitter. That is, a beam of light is split into n beams of light. More than one beam of light to be added is combined, by an optical splitter 35, into one beam of light, input into an optical splitter 36, and converges with the output light that passes through the WB 32. The light split by the optical splitter 36 is combined by an optical combiner 37. FIG. 5 shows an optical switching device featuring colorlessness. An optical multiplexer is provided to implement colorless adding of light with various wavelengths. However, the optical switching device in FIG. 5 has the following problems: The tunable filter has high insertion loss, and the costs is high.

SUMMARY

To solve the technical problems in the prior art, the present invention provides a device and a method for colorless optical switching to realize colorless optical switching, lower the costs, and reduce the insertion loss.

A device for colorless optical switching according to embodiments of the present invention includes:

a demultiplexer, configured to demultiplex the input multi-wavelength light into multiple beams of light with single wavelength;

a first optical cross unit, configured to receive the multiple beams of light with single wavelength, obtained by the demultiplexer in the way of demultiplexing, and output the multiple beams of light with single wavelength through target ports;

an optical switch array, configured to: receive multiple beams of light with single wavelength output by the first optical cross unit, and drop a light that needs to be dropped, from the multiple beams of light with single wavelength output by the first optical cross unit, to the local node; receive a light added by the local node; and output a light that needs to pass, from the multiple beams of light with single wavelength output by the first optical cross unit and the light added by the local node;

a combiner, configured to combine the light output by the optical switch array.

A method for colorless optical switching according to embodiments of the present invention includes:

demultiplexing, by the demultiplexer, the input multi-wavelength light into multiple beams of light with single wavelength;

receiving, by the first optical cross unit, the multiple beams of light with single wavelength, and outputting the multiple beams of light with single wavelength through target ports of the first optical cross unit;

receiving, by the optical switch array, multiple beams of light with single wavelength output by the first optical cross unit, dropping a light that needs to be dropped, from the multiple beams of light with single wavelength output by the first optical cross unit, receiving a light added by the local node, and outputting a light that needs to pass, from the multiple beams of light with single wavelength output by the first optical cross unit and the light added by the local node; and combining, by a combiner, the light output by the optical switch array.

The device for optical switching according to embodiments of the present invention can output the light with any wavelength through any port of the first optical cross unit by using the first optical cross unit and the optical switch array, featuring colorlessness, low insertion loss, and low costs.

The technical solution of the present invention is further elaborated with reference to the accompanying drawings and embodiments.

DETAILED DESCRIPTION OF THE EMBODIMENTS

Figure 1:
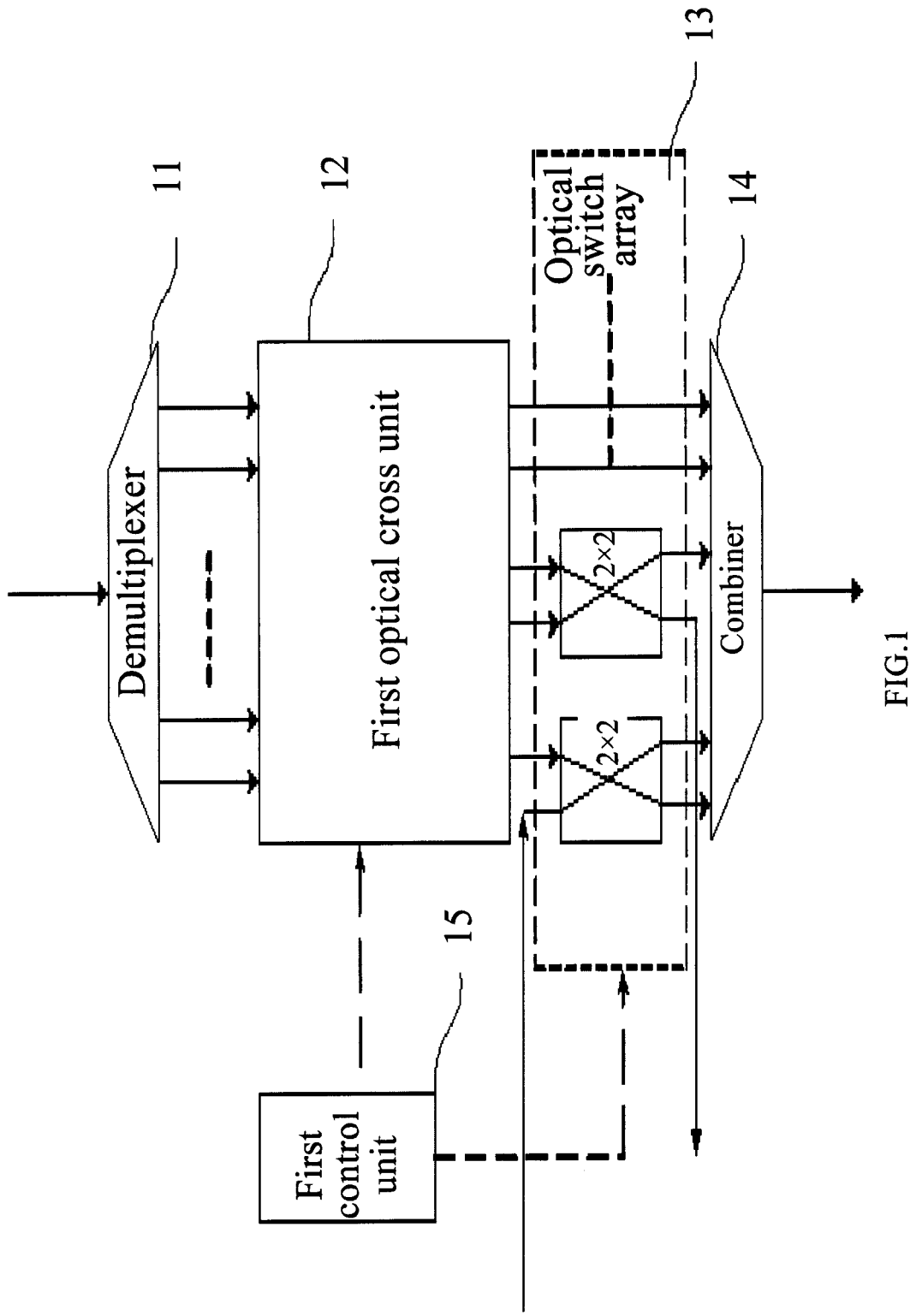
FIG. 1 is a schematic diagram showing the structure of an optical switching device according to a first embodiment of the present invention.

FIG. 1 is a schematic diagram showing the structure of an optical switching device according to a first embodiment of the present invention. The optical switching device includes a demultiplexer 11, a first optical cross unit 12, an optical switch array 13, and a combiner 14, where the first optical cross unit 12 is respectively connected to the demultiplexer 11 and the optical switch array 13, and the optical switch array 13 is connected to the combiner 14. The demultiplexer 11 is configured to demultiplex the input multi-wavelength light into multiple beams of light with single wavelength; the first optical cross unit 12 is configured to receive the multiple beams of light with single wavelength, obtained by the demultiplexer 11 in the way of demultiplexing, and output the multiple beams of light with single wavelength through target ports; the optical switch array 13 is configured to receive multiple beams of light with single wavelength output by the first optical cross unit 12, drop the light that needs to be dropped, from the multiple beams of light with single wavelength output by the first optical cross unit 12, to the local node, receive a light added by the local node, and output a light that needs to pass, from the multiple beams of light with single wavelength output by the first optical cross unit 12 and the light added by the local node; the combiner 14 is configured to combine the light output by the optical switch array 13.

In the field of optical communications, it is a common means that multiple beams of light with wavelength are combined by a multiplexer and transmitted through one optical fiber, and then demultiplexed by the demultiplexer into multiple beams of light with single wavelength.

The optical cross unit is a non-blocking switch. It can realize switching of light at any input port and any output port, featuring transparency for bit, protocol, and wavelength. The optical cross unit according to embodiments of the present invention may be a 3-dimensional (3D) Micro-Electro-Mechanical Systems (MEMS) optical switch.

The optical switch array is composed of multiple optical switches. The optical switch may be a 2×2 optical switch, or a 4×4 optical switch, which depends on the actual condition of the optical communication network.

The optical switch device shown in FIG. 1 may further include a first control unit 15 respectively connected to the first optical cross unit 12 and the optical switch array 13, and configured to send a first control information to the first optical cross unit 12, and send a second control information to optical switch array 13, where:

the first control information is information about the target port through which the first optical cross unit 12 outputs the multiple beams of light with single wavelength;

the second control information includes: information about a light that needs to be dropped, from the multiple beams of light with single wavelength; information about the port through which the optical switch array 13 drops the light that needs to be dropped, from the multiple beams of light with single wavelength, to the local node; information about the port through which the optical switch array 13 receives the light added by the local node, information about the port through which the optical switch array 13 outputs the light that needs to pass, from the multiple beams of light with single wavelength, and information about the port through which the optical switch array 13 outputs the light added by the local node.

The first control unit 15 sends the first control information to the first optical cross unit 12, and sends the second control information to the optical switch array 13, thereby controlling transmission of multi-wavelength light in the first optical cross unit 12 and the optical switch array 13.

The working principles of the optical switching device as shown in FIG. 1 are as follows: The demultiplexer demultiplexes the multi-wavelength light into multiple beams of light with single wavelength, and the first optical cross unit receives the multiple beams of light with single wavelength output by the demultiplexer, and outputs the multiple beams of light with single wavelength through the target ports under the control of the first control unit, where the target ports are the ports through which the first optical cross unit outputs the multiple beams of light with single wavelength and the target ports are determined by the first control unit; the optical switch array receives multiple beams of light with single wavelength output by the first optical cross unit under the control of the first control unit, drops the light that needs to be dropped, from the multiple beams of light with single wavelength output by the first optical cross unit, to the local node, receives the light added by the local node, and outputs the light that needs to pass, from the multiple beams of light with single wavelength output by the first optical cross unit and the light added by the local node; the combiner combines the light with various wavelengths output by the optical switch array.

Figure 2:
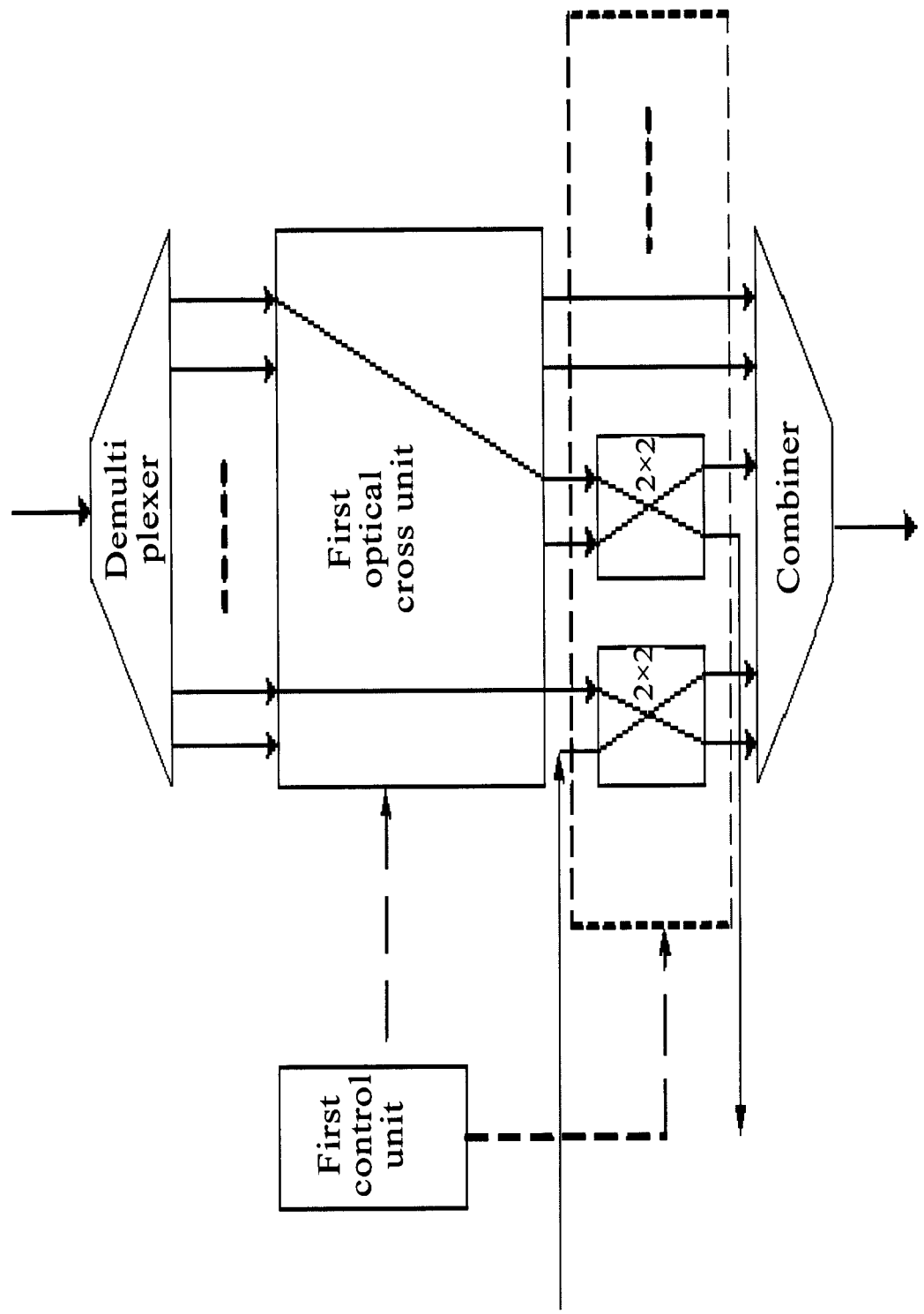
FIG. 2 is a schematic diagram showing transmission paths through which the light with various wavelengths is transmitted.

FIG. 2 is a schematic diagram showing the transmission paths for the light with various wavelengths shown in FIG. 1. In FIG. 2, the light with wavelengths being $\lambda_1$ and $\lambda_2$ that are obtained through demultiplexing by the demultiplexer emits from the target ports in the first optical cross unit. The light with wavelength being $\lambda_3$ is light added by the local node, the light with wavelength being $\lambda_2$ is light that needs to pass, the light with wavelength being $\lambda_1$ is light that needs to be dropped to the local node, and the light with wavelengths being $\lambda_2$ and $\lambda_3$ is output from the optical switch array and combined by the combiner.

When the number of wavelengths of the light to be added or dropped increases, the optical switches in the optical switch array shown in FIG. 2 may be added. For example, when 8 wavelengths are to be added or dropped, eight 2×2 optical switches are needed; if 16 wavelengths are to be added or dropped, it is only necessary to add another eight 2×2 optical switches. The optical switch array provided in the embodiment of the present invention features reconstruction and easy extension.

The optical switching device according to a first embodiment of the present invention can output the light with any wavelength through any port of the first optical cross unit by using the first optical cross unit and the optical switch array, add light with any wavelength through any port of the optical switch array, and drop light with any wavelength from any port of the optical switch array, featuring colorlessness, low insertion loss, and low costs compared with the tunable filter in the prior art. In the first embodiment of the present invention, the ports in the optical switch array are taken as the ports through which light is added and dropped. It is unnecessary to add the port in the first optical cross unit to add and drop light, thereby reducing the number of ports in the first optical cross unit and reducing costs, featuring reconstruction and easy extension.

Figure 3:
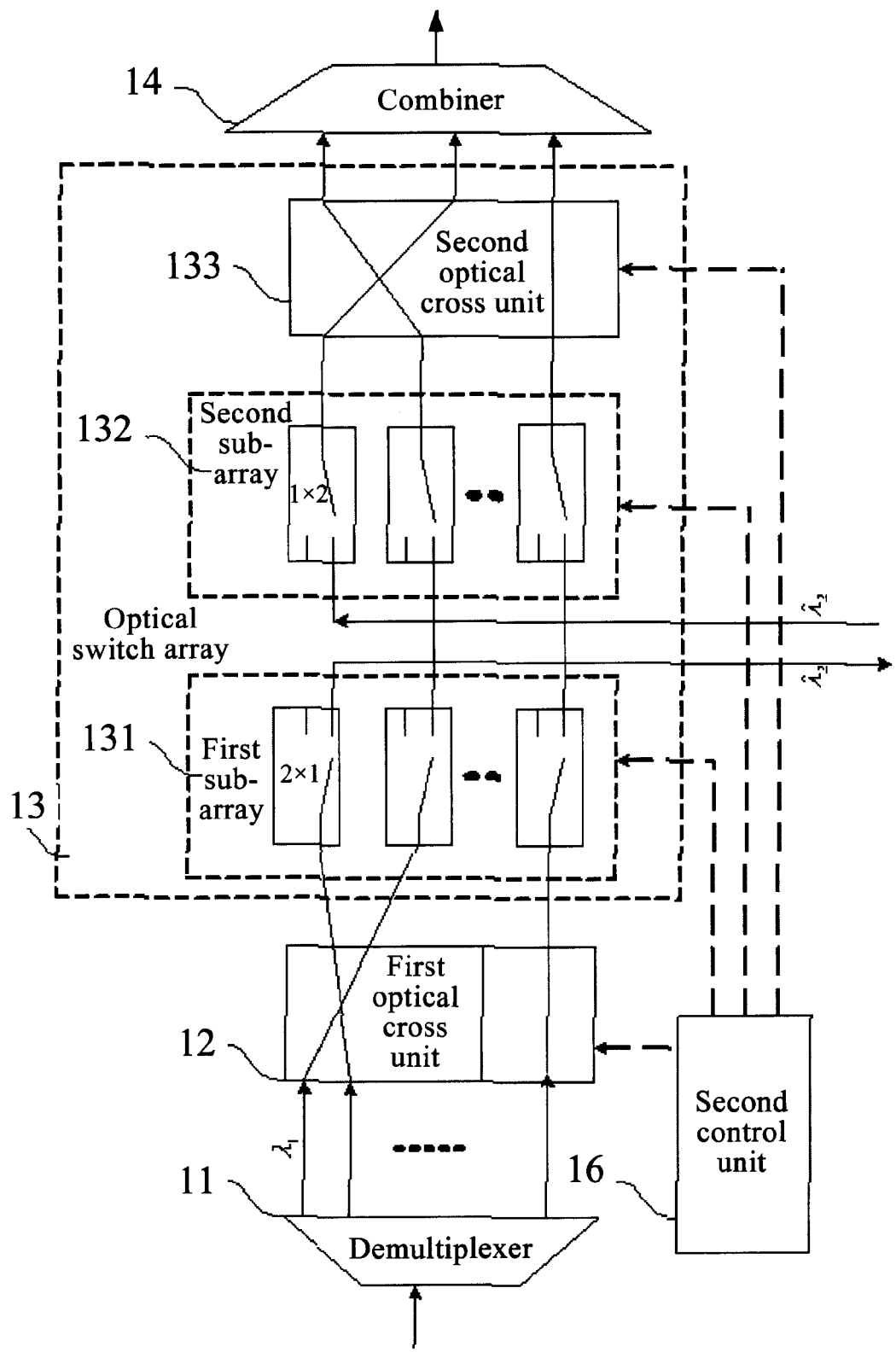
FIG. 3 is a schematic diagram showing the structure of an optical switching device according to a second embodiment of the present invention.

FIG. 3 is a schematic diagram showing the structure of the optical switching device according to a second embodiment of the present invention. The second embodiment differs from the embodiment shown in FIG. 1 in the following: In the second embodiment, the optical switch array 13 includes a first sub-array 131, a second sub-array 132, and a second optical cross unit 133, where the first sub-array 131 is configured to receive multiple beams of light with single wavelength output by the first optical cross unit 12, drop the light that needs to be dropped, from the multiple beams of light with single wavelength output by the first optical cross unit 12, and input the light that needs to pass, from the multiple beams of light with single wavelength output by the first optical cross unit 12, into the second sub-array 132; the second sub-array 132 is configured to receive the light that needs to pass, from multiple beams of light with single wavelength output by the first sub-array 131, receive the light added by the local node, and output the light that needs to pass, from the multiple beams of light with single wavelength and the light that is added by the local node; the second optical cross unit 133 is configured to receive the light output by the second sub-array 132, where the light output by the second sub-array 132 includes the light that needs to pass, from the multiple beams of light with single wavelength and the light added by the local node, and output the light that needs to pass, from the light with multiple single wavelengths and the light added by the local node from target ports.

The optical switch device shown in FIG. 3 further includes a second control unit 16 respectively connected to a first optical cross unit 12, a first sub-array 131, a second sub-array 132, and a second optical cross unit 133, and configured to send third control information to the first optical cross unit 12, send fourth control information to the first sub-array 131, send fifth control information to the second sub-array 132, and send sixth control information to the second optical cross unit 133, where:

the third control information is information about the target ports through which the first optical cross unit 12 outputs multiple beams of light with single wavelength;

the fourth control information includes information about the light to be dropped, from the multiple beams of light with single wavelength, information about the port through which the first sub-array 131 drops light to be dropped, from the multiple beams of light with single wavelength, and information about the port through which the first sub-array 131 outputs the light that needs to pass, from the multiple beams of light with single wavelength;

the fifth control information includes information about the port through which the second sub-array 132 outputs the light that needs to pass, from the multiple beams of light with single wavelength, information about the port through which the second sub-array 132 receives the light added by the local node, and information about the port through which the second sub-array 132 outputs the light added by the local node;

the sixth control information includes information about the port through which the second optical cross unit 133 outputs the light that needs to pass, from the multiple beams of light with single wavelength, and information about the port through which the second optical cross unit 133 outputs the light added by the local node.

The first sub-array 131 may be an array including multiple 1×2 optical switches, and the second sub-array 132 may be an array including multiple 2×1 optical switches.

The working principles of the optical switch device shown in FIG. 3 are as follows: The input light after being demultiplexed by the demultiplexer is called multiple beams of light with single wavelength. For example, with reference to the light with wavelengths being $\lambda_1, \lambda_2, \lambda_3, \ldots,$ and $\lambda_n$, under the control of the second control unit, the first sub-array drops beams of light that needs to be dropped (such as light with the wavelength being $\lambda_2$), to the local node, and input other beams of light that needs to pass into the second sub-array; the second sub-array receives the light added by the local node (such as light with the wavelength being $\lambda_2$), and output the light added by the local node and light that needs to pass (such as light with the wavelength being $\lambda_1$) to the second optical cross unit; light with various wavelengths can be re-selected in the second optical cross unit, for example, can selectively be output through different target ports; the combiner combines the light output by the second optical cross unit.

In the embodiments of the present invention, the combiner may be a coupler or a multiplexer. The ports of the coupler have no requirement on the wavelength, that is, ports of the coupler accept light with any wavelength within the acceptable range. The ports of the multiplexer, however, give limitation to the wavelength, that is, ports of the multiplexer accept only light with specific wavelengths. In the optical switching device shown in FIG. 2, the combiner may be a coupler. The light output from 2×2 optical switches may be directly input into the optical multiplexer. The combiner in FIG. 3 may be a multiplexer. The second optical cross unit is placed between the second sub-array and the combiner. The port can be selected via the second optical cross unit, where light output from the second sub-array is output through the selected port, so that the wavelengths of light output by the second optical cross unit correspond to ports of the combiner, thereby realizing optical switching.

The optical switching device shown in FIG. 3 uses the second optical cross unit and multiplexer in combination to output the light output by the second sub-array, thereby featuring low insertion loss, in comparison with the technical solution that the optical switching device shown in FIG. 2 directly uses the coupler to output the light output from 2×2 optical switches.

With reference to the optical switching device shown in FIG. 3, when the number of wavelengths to be added or dropped increases, the first sub-array and the second sub-array can be expand to meet the demands.

The local nodes in embodiments of the present invention refer to the nodes equipped with the optical switching device in the optical network. Such nodes can realize the adding and dropping of light with various wavelengths.

Figure 4:
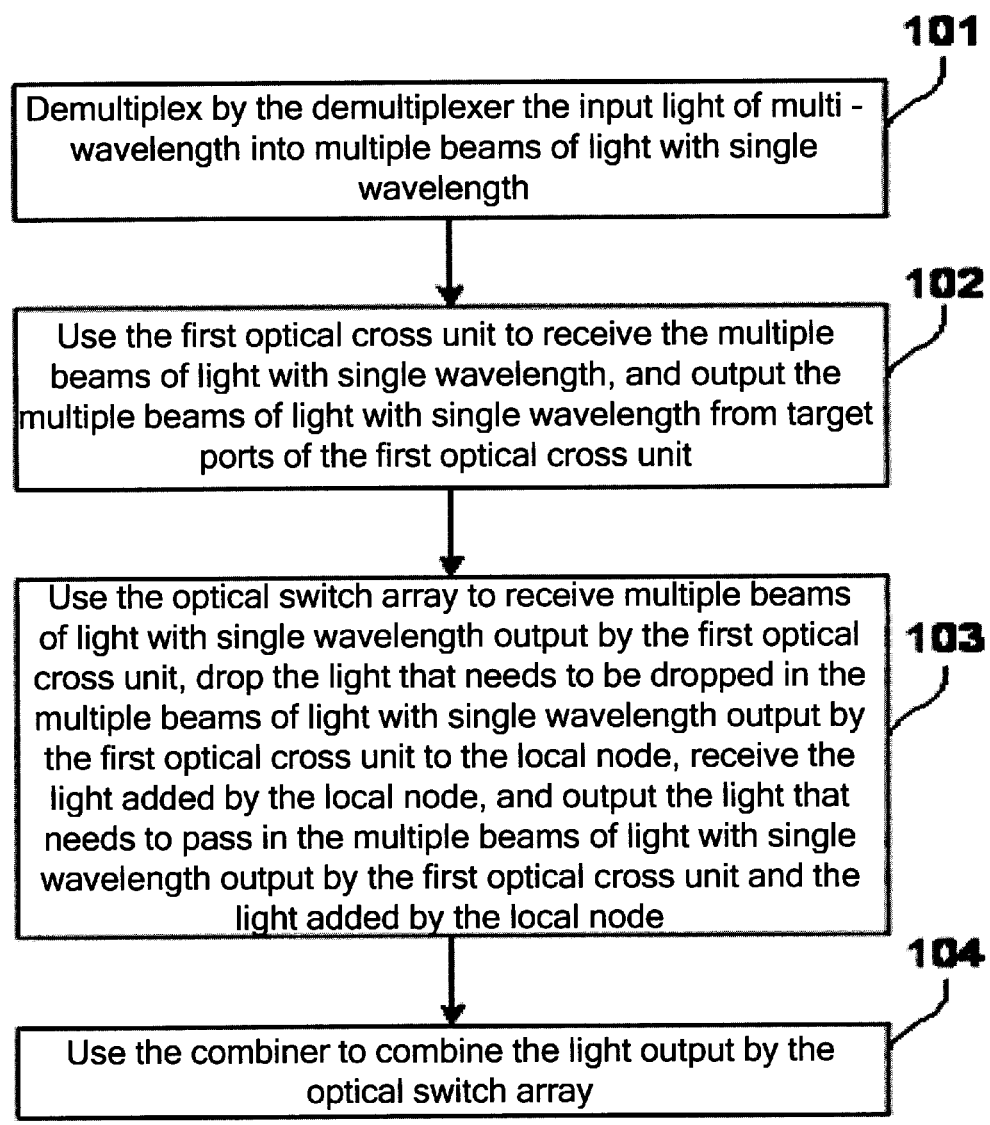
FIG. 4 is a flowchart of a method for colorless optical switching according to a first embodiment of the present invention.
Figure 5:
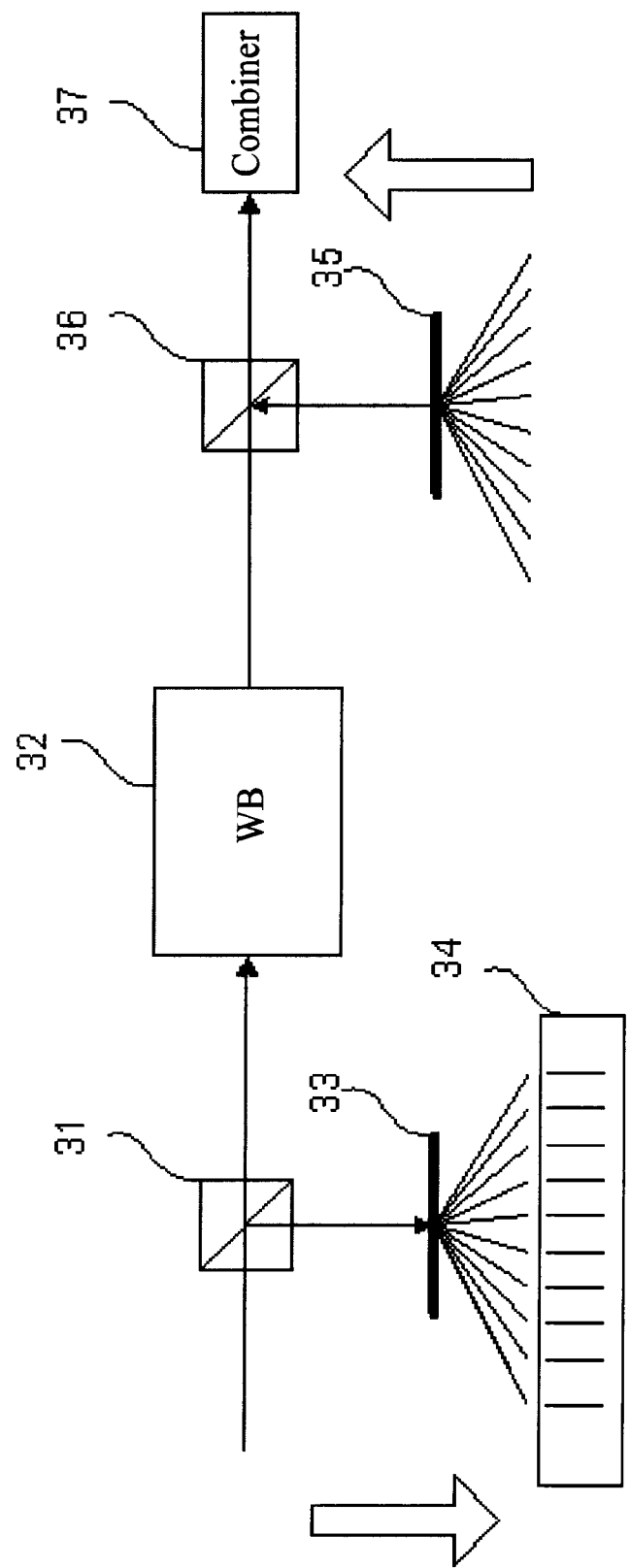
FIG. 5 is a schematic diagram showing the structure of an optical switching device in the prior art.

FIG. 4 is a flowchart of a method for colorless optical switching according to a first embodiment of the present invention.

Step 101: The demultiplexer demultiplexes the input multi-wavelength light into multiple beams of light with single wavelength.

Step 102: The first optical cross unit receives the multiple beams of light with single wavelength, and outputs the multiple beams of light with single wavelength through the target ports of the first optical cross unit.

Step 103: The optical switch array receives multiple beams of light with single wavelength output by the first optical cross unit, drops the light that needs to be dropped, from the multiple beams of light with single wavelength output by the first optical cross unit, to the local node, receives the light added by the local node, and outputs the light that needs to pass, from the multiple beams of light with single wavelength output by the first optical cross unit and the light added by the local node.

Step 104: The combiner combines the light output by the optical switch array.

Specifically, step 103 may further include the following:

Step 1031: The first sub-array in the optical switch array receives the multiple beams of light with single wavelength output by the first optical cross unit, drops the light that needs to be dropped, from the multiple beams of light with single wavelength output by the first optical cross unit, to the local node, and inputs the light that needs to pass, from the multiple beams of light with single wavelength output by the first optical cross unit, into the second sub-array of the optical switch array.

Step 1032: The second sub-array receives the light that needs to pass, from the multiple beams of light with single wavelength output by the first sub-array, receives the light added by the local node, and outputs the light that needs to pass, from multiple beams of light with single wavelength and the light added by the local node.

Step 1033: The second optical cross unit in the optical switch array receives the light output by the second sub-array, where the light output by the second sub-array includes the light that needs to pass, from the multiple beams of light with single wavelength output by the second sub-array and the light added by the local node, and outputs the light that needs to pass and the light added by the local node through the target ports in the second optical cross unit.

It is to be noted that the above descriptions are merely some exemplary embodiments of the present invention, but not intended to limit the scope of the present invention. Those skilled in the art should understand that: Any modification, equivalent replacement, or improvement made without departing from the spirit and principle of the present invention should fall within the scope of the present invention.

What is claimed is:

1. A device for colorless optical switching, comprising:
  a demultiplexer, configured to demultiplex input multi-wavelength light into multiple beams of light with single wavelength;
  a first optical cross unit, configured to receive the multiple beams of light with single wavelength, obtained by the demultiplexer in the way of demultiplexing, and output the multiple beams of light with single wavelength through target ports;
  an optical switch array, configured to receive multiple beams of light with single wavelength output by the first optical cross unit, drop light that needs to be dropped, from the multiple beams of light with single wavelength output by the first optical cross unit, to a local node, receive light added by the local node, and output light that needs to pass, from the multiple beams of light with single wavelength output by the first optical cross unit and the light added by the local node; and
  a combiner, configured to combine the light output by the optical switch array.

2. The device according to claim 1, further comprising a first control unit, connected to the first optical cross unit and the optical switch array and configured to send a first control information to the first optical cross unit, and a send second control information to a second optical cross unit, wherein the first control information is information about target ports through which the first optical cross unit outputs the multiple beams of light with single wavelength, and the second control information comprises information about light to be dropped, from the multiple beams of light with single wavelength, information about a port through which the optical switch array drops light that needs to be dropped, from the multiple beams of light with single wavelength, to a local node, information about a port through which the optical switch array receives the light added by the local node, and information about a port through which the optical switch array outputs the light that needs to pass, from the multiple beams of light with single wavelength, and information about a port through which the optical switch array outputs the light added by the local node.

3. The device according to claim 2, wherein the combiner is a coupler.

4. The device according to claim 1, wherein the optical switch array comprises a first sub-array, a second sub-array, and a second optical cross unit;
  the first sub-array is configured to receive the multiple beams of light with single wavelength output by the first optical cross unit, drop the light that needs to be dropped, from the multiple beams of light with single wavelength output by the first optical cross unit, to the local node, and input the light that needs to pass, from the multiple beams of light with single wavelength output by the first optical cross unit, into the second sub-array;
  the second sub-array is configured to receive the light that needs to pass, from the multiple beams of light with single wavelength output by the first sub-array, receive the light added by the local node, and output the light that needs to pass, from the light with multiple single wavelengths and the light added by the local node; and
  the second optical cross unit is configured to receive the light, output by the second sub-array, that needs to pass, from the light with multiple single wavelengths and the light added by the local node output by the second sub-array, and output the light that needs to pass, from the multiple beams of light with single wavelength and the light added by the local node from the target ports.

5. The device according to claim 4, further comprising a second control unit, respectively connected to the first optical cross unit, the first sub-array, the second sub-array, and the second optical cross unit, and configured to send third control information to a first optical cross unit, send a fourth control information to the first sub-array, send a fifth control information to the second sub-array, send a sixth control information to the second optical cross unit, wherein:
  the third control information is information about target ports through which the first optical cross unit outputs the multiple beams of light with single wavelength;
  the fourth control information is information about the light that needs to be dropped, from the multiple beams of light with single wavelength, information about a port through which the first sub-array drops the light that needs to be dropped, from the multiple beams of light with single wavelength, to the local node, and information about a port through which the first sub-array outputs light that needs to pass, from the multiple beams of light with single wavelength;
  the fifth control information comprises information about a port through which the second sub-array outputs the light that needs to pass, from the multiple beams of light with single wavelength, information about a port through which the second sub-array receives the light added by the local node, and information about a port through which the second sub-array outputs the light added by the local node;
  the sixth control information comprises information about a port through which the second optical cross unit outputs the light that needs to pass, from the multiple beams of light with single wavelength, and information about a port through which the second optical cross unit outputs the light added by the local node.

6. The device according to claim 5, wherein the combiner is a multiplexer.

7. The device according to claim 6, wherein the first optical cross unit and the second optical cross unit are 3-dimensional (3D) Micro-Electro-Mechanical Systems (MEMS) optical switches.

8. A method for colorless optical switching, comprising:
  demultiplexing, by a demultiplexer, input multi-wavelength light into multiple beams of light with single wavelength;
  receiving, by a first optical cross unit, the multiple beams of light with single wavelength, and outputting the multiple beams of light with single wavelength through target ports of the first optical cross unit;
  receiving, by an optical switch array, the multiple beams of light with single wavelength output by the first optical cross unit, dropping light that needs to be dropped, from the multiple beams of light with single wavelength output by the first optical cross unit, to a local node, receiving light added by the local node, and outputting light that needs to pass, from the multiple beams of light with single wavelength output by the first optical cross unit and the light added by the local node; and combining, by a combiner, the light output by the optical switch array.

9. The method according to claim 8, wherein the receiving, by an optical switch array, the multiple beams of light with single wavelength output by the first optical cross unit, dropping light that needs to be dropped, from the multiple beams of light with single wavelength output by the first optical cross unit, to the local node, receiving light added by the local node, and outputting light that needs to pass, from the multiple beams of light with single wavelength output by the first optical cross unit and the light added by the local node comprise:

receiving, by a first sub-array in the optical switch array, the multiple beams of light with single wavelength output by the first optical cross unit, dropping the light that needs to be dropped, from the multiple beams of light with single wavelength output by the first optical cross unit, to the local node, and inputting the light that needs to pass, from the multiple beams of light with single wavelength output by the first optical cross unit into a second sub-array of the optical switch array;

receiving, by the second sub-array, the light that needs to pass, from the multiple beams of light with single wavelength output by the first sub-array, receiving the light added by the local node, and outputting the light that needs to pass in the light with multiple single wavelengths and the light added by the local node; and receiving, by a second optical cross unit in the optical switch array, the light, output by the second sub-array, that needs to pass in the multiple single light and the light, output by the second sub-array, added by the local node, and outputting the light that needs to pass in the multiple beams of light with single wavelength and the light added by the local node through target ports in the second optical cross unit.

* * * * *